Patented Mar. 10, 1942

2,275,467

UNITED STATES PATENT OFFICE 2,275,467

PREPARATION OF UNSATURATED ALCOHOL ESTERS

Maxwell A. Pollack, Akron, and Albert G. Chenicek, Barberton, Ohio, assignors to Pittsburgh Plate Glass Company, Allegheny County, Pa., a corporation of Pennsylvania No Drawing. Application January 27, 1940, Serial No. 315,969

21 Claims. (Cl. 260—475)

This invention relates to the preparation of unsaturated polyesters of polycarboxylic acids. In the preparation of such esters by ordinary methods of esterifying the acid with a suitable alcohol, yields are often low. While somewhat higher yields may be secured when unsaturated halides are reacted with salts of these acids, in some cases the yields obtained in this manner are objectionably low.

In accordance with our invention, we have found that unsaturated alcohol esters of polycarboxylic acids may be prepared in high yield by reacting an unsaturated halide with a salt of a partially esterified acid. The process is particularly adapted to the production of esters of allyl type alcohols from allyl type halides, particularly allyl type chlorides which contain the characteristic grouping

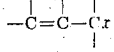

where $x$ is halogen such as chlorine, bromine, fluorine, or iodine. Thus, allyl, methallyl, crotyl, 2-chlorallyl, ethyl allyl or cinnamyl chloride, bromide, or iodide may be utilized for this purpose. Other halides such as oleyl, propargyl, or linoleyl chloride, or other unsaturated halide which contains at least one halogen atom attached to a saturated carbon atom may also be treated in accordance with the present invention, although the yields obtained often are not as high as those obtained through use of allyl type halides.

In order to secure high yields the acid should be partially esterified with a suitable organic alcohol such as allyl, methallyl, ethyl allyl, crotyl, 2-chloroallyl, cinnamyl, propargyl, or oleyl alcohols, or the saturated alcohols such as methyl, ethyl, propyl, butyl, amyl, lauryl, or other alcohol or mercaptan to form a partial ester. Partial esters of phthalic, oxalic, maleic, succinic, malonic, fumaric, tartaric, citric, adipic, suberic, or glutaric acid or other polycarboxylic acids may be formed, converted into salts and treated in accordance with the invention. In addition, partial esters of kojic acid, cyanuric acid, ammeline, ammelide, may be treated in this manner. In general, it is found that the yields obtained from salts of relatively weak acids are substantially greater than those obtained from salts of relatively strong acids. For this reason it is desirable to use salts of weak organic acids which have determinable dissociation constants, generally below about 0.05, and preferably not in excess of 0.02.

In the preparation of esters from acids containing more than two acid groups a salt of either the mono or diester or other partial polyester may be used. Thus, while in the preparation of diallyl, dimethallyl or dicrotyl phthalate, oxalate, tartrate, or similar ester, a salt of the corresponding mono allyl ester may be used, allyl citrates may be prepared from a salt of mono or diallyl citrate. Mixed esters may be prepared by treatment of the partially esterified acid with a halide of a different alcohol. For example, allyl-crotyl phthalate, oxalate, succinate, tartrate, maleate, etc. may be prepared from the salts of the mono allyl ester and crotyl chloride, or a salt of the mono crotyl ester and allyl chloride. In similar manner, alkyl-alkenyl esters such as mono allyl-mono methyl, mono ethyl, mono propyl, or mono butyl phthalate, etc. may be prepared from salts of mono alkyl esters.

Various salts have been found to be effective but in general, the alkali metal salts, particularly sodium salts, are most suitable. Thus, sodium salts of mono allyl, mono methallyl, mono crotyl, mono propargyl, mono vinyl, mono methyl, or mono ethyl phthalate, tartrate, adipate, maleate, fumarate, etc. may be subjected to treatment in accordance with the invention. In addition, the corresponding salts of other metals or metallic radicles such as potassium, lithium, ammonium, calcium, barium, strontium, magnesium, copper, zinc, iron, chromium, or silver may be treated. Similarly, partial esters of salts of inorganic acids such as salts of the partial alkyl or alkenyl esters of phosphoric, sulphurous, silicic, titanic, or chromic acids may be treated.

We have found that the reaction between the unsaturated halide and the phthalate salt may be conducted with an improved yield in the presence of a substantial quantity of water which appears to assist the reaction. We have also found improved yields may be secured by introduction of a small quantity of an agent capable of reducing the surface tension of aqueous solutions such as sodium oleate, trisodium phosphate, the sulphate alcohols, lauryl, hexyl or octyl sulphate, sulphated or sulphonate petroleum or vegetable oils such as Turkey red oil, alcohols such as methyl or ethyl alcohol, aryl or aralkyl sulphates or sulphonates, such as isopropyl naphthalene sulphonic acid, benzene sulphonic acid, phenol sulphonic acid, alkylol amines such as mono, di or triethanol amine or inorganic surface tension reducing agents such as sodium silicate colloidal silicic acid. The concentration of this agent may be varied but in general, should not be present in large quantities. Generally, sufficient agent should be used to reduce the surface tension of the solution to below about 50 to 60 dynes per centimeter. 0.1 to 0.5 percent has been found suitable for most purposes. In general, excess concentrations of wetting agents such as alcohol are undesirable since the alcohol increases the solubility of the ester in the aqueous medium, thus making preparation of the ester more difficult.

The amount of water present should be sufficient to dissolve all or a substantial portion of the salt or at least to form a thin aqueous slurry of the salt. In general, it is preferred to utilize a solution which is not excessively concentrated. The reaction is preferably assisted by application of heat to maintain the temperature of the reaction mixture at 40 to 250° C. The reaction may be conducted in a closed vessel and pressure may be applied, if desired, but in many cases this is undesirable since polymerization of the allyl chloride and/or the ester may occur thus complicating the reaction. In accordance with our invention, we have found that it is desirable to avoid the use of pressure. This may be done by introducing vapors of the unsaturated halides into the lower portion of an aqueous solution or dispersion of the salt, whereby reaction occurs and the vapors are absorbed. When mixtures containing vinyl type halides are used, the vinyl type olefins do not react and pass through the solution and may be collected and condensed, if desired, as they escape from the reaction solution. If all of the allyl chloride, allyl-type halide or other unsaturated reactive halide is not absorbed, the vapors may be recycled or retreated in order to complete the separation. The halide vapors may be bubbled through the solution continuously if desired, and a portion of the solution withdrawn continuously or intermittently. The ester thus formed separates into a layer and may be withdrawn. In the case of such materials as diallyl phthalate, the ester generally settles to the bottom of the container. However, if relatively concentrated solutions of the salt are used, or if the ester becomes mixed with allyl chloride or other similar chlorolefin, the mixture may rise to the surface of the aqueous solution.

The following examples are illustrative:

Example I

Allyl chloride vapor was introduced continuously into the base of a column of an aqueous solution containing 20 percent by weight of allyl sodium phthalate and 0.5 percent by weight of isopropyl naphthalene sodium sulphonate at a temperature of 90 to 100° C. The process was continued for five hours. The allyl phthalate separated as a layer in a lower portion of the column and was withdrawn periodically. A yield of 70 percent of diallyl phthalate was secured.

Example II

The process described in Example I was repeated using a saturated solution of sodium allyl succinate at a temperature of 85 to 95° C. and diallyl succinate was secured.

Example III

The process described in Example I was repeated using a 20 percent solution of sodium allyl maleate, diallyl maleate being obtained.

Example IV

The process of Example I was repeated using a solution containing 20 percent of sodium ethyl maleate, allyl ethyl maleate being obtained.

While the invention has been described with particular reference to the production of the esters in an aqueous medium, the invention is not so limited since the esters may be prepared by heating the salt and the unsaturated halide in the substantial absence of water and in the presence or absence of solvents such as alcohol or ether. This process is often advantageous when the ester being formed is hydrolyzed readily as in the case of many oxalic acid esters.

Although the present invention has been described with particular reference to the specific details of certain embodiments thereof, it is not intended that such details shall be regarded as limitations upon the scope of the invention except insofar as included in the accompanying claims.

We claim:

1. A method of preparing an ester of a polycarboxylic acid which comprises reacting a salt of an unsaturated partial ester of a polycarboxylic acid with an unsaturated halide which contains a halogen atom attached to a saturated carbon atom whereby an unsaturated ester is formed.

2. A method of preparing an ester of a polycarboxylic acid which comprises reacting a salt of an alkenyl partial ester of a polycarboxylic acid with an unsaturated halide which contains a halogen atom attached to a saturated carbon atom whereby an unsaturated ester is formed.

3. A method of preparing an ester of a polycarboxylic acid which comprises reacting a salt of an alkenyl partial ester of a polycarboxylic acid with an unsaturated chloride which contains a halogen atom attached to a saturated carbon atom whereby an unsaturated ester is formed.

4. A method of preparing an ester of a polycarboxylic acid which comprises reacting a salt of an unsaturated partial ester of a polycarboxylic acid with an allyl type chloride whereby an unsaturated ester is formed.

5. A method of preparing an ester of a polycarboxylic acid which comprises reacting an alkali metal salt of an unsaturated partial ester of a polycarboxylic acid with an allyl type chloride whereby an unsaturated ester is formed.

6. A method of preparing an ester of a polycarboxylic acid which comprises reacting an aqueous dispersion of a salt of an unsaturated partial ester of a polycarboxylic acid with an allyl type chloride whereby an unsaturated ester is formed.

7. A method of preparing an ester of a polycarboxylic acid which comprises reacting an aqueous solution of an alkali metal salt of an unsaturated partial ester of a polycarboxylic acid with an allyl type chloride whereby an unsaturated ester is formed.

8. A method of preparing an ester of a polycarboxylic acid which comprises reacting an aqueous dispersion of a salt of an unsaturated partial ester of a polycarboxylic acid with an allyl type chloride in the presence of an agent capable of reducing the surface tension of the aqueous medium below 60 dynes per centimeter whereby an unsaturated ester is formed.

9. A method of preparing a polyunsaturated ester which comprises reacting a salt of an al'yl type partial ester of a polycarboxylic acid with the corresponding allyl type halide whereby the corresponding polyester is formed.

10. A method of preparing a polyallyl ester of a carboxylic acid which comprises reacting a salt of an allyl partial ester of a polycarboxylic acid with allyl chloride whereby the corresponding polyester is formed.

11. A method of preparing a polyunsaturated ester which comprises reacting an alkali metal salt of an allyl type partial ester of a polycarboxylic acid with the corresponding allyl type halide whereby the corresponding polyester is formed.

12. A method of preparing a polyunsaturated ester which comprises reacting an aqueous solution of an alkali metal salt of an allyl type partial ester of a polycarboxylic acid with the corresponding allyl type chloride whereby the corresponding polyester is formed.

13. A method of preparing a polyunsaturated ester which comprises reacting an aqueous solution of a salt of an allyl type partial ester of a polycarboxylic acid with the corresponding allyl type chloride whereby the corresponding polyester is formed.

14. A method of preparing a polyunsaturated ester which comprises reacting an aqueous solution of a salt of an allyl type partial ester of a polycarboxylic acid with the corresponding allyl type chloride in the presence of an agent capable of reducing the surface tension of the aqueous medium below 60 dynes per centimeter whereby the corresponding polyester is formed.

15. A method of preparing an ester of phthalic acid which comprises reacting a salt of a mono alkenyl ester of phthalic acid with an allyl halide whereby a diester is formed.

16. A method of preparing diallyl phthalate which comprises reacting a salt of mono allyl phthalate with an allyl halide.

17. A method of preparing a phthalate ester which comprises reacting a salt of mono methallyl phthalate with a methallyl halide.

18. A method of preparing an ester of an acid of the group consisting of maleic and fumaric acids which comprises reacting a salt of a mono alkenyl ester of an acid of the group consisting of maleic and fumaric acids with an allyl halide whereby a diester is formed.

19. The process of claim 18 wherein the alkenyl ester is an allyl ester.

20. A method of preparing an ester which comprises reacting a salt of a partial ester of a weak organic polybasic acid with an unsaturated halide which contains a halogen atom attached to a saturated carbon atom whereby an unsaturated ester is formed.

21. A method of preparing an ester which comprises reacting a salt of a partial ester of a polycarboxylic acid with an unsaturated halide which contains a halogen atom attached to a saturated carbon atom whereby an unsaturated ester is formed.

MAXWELL A. POLLACK.
ALBERT G. CHENICEK.